United States Patent
Nakagawa

(10) Patent No.: US 11,582,666 B2
(45) Date of Patent: Feb. 14, 2023

(54) COMMUNICATION APPARATUS, CONTROL METHOD OF COMMUNICATION APPARATUS, AND COMPUTER-READABLE STORAGE MEDIUM

(71) Applicant: CANON KABUSHIKI KAISHA, Tokyo (JP)

(72) Inventor: Toshiyuki Nakagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/210,332

(22) Filed: Mar. 23, 2021

(65) Prior Publication Data

US 2021/0211959 A1 Jul. 8, 2021

Related U.S. Application Data

(63) Continuation of application No. PCT/JP2019/035673, filed on Sep. 11, 2019.

(30) Foreign Application Priority Data

Sep. 27, 2018 (JP) .............................. JP2018-182090

(51) Int. Cl.
*H04W 36/10* (2009.01)
*H04W 24/02* (2009.01)
*H04W 88/12* (2009.01)
*H04W 84/12* (2009.01)

(52) U.S. Cl.
CPC ........... *H04W 36/10* (2013.01); *H04W 24/02* (2013.01); *H04W 88/12* (2013.01); *H04W 84/12* (2013.01)

(58) Field of Classification Search
CPC ..... H04W 36/10; H04W 24/02; H04W 88/12; H04W 88/08; H04W 84/12; H04W 84/20
See application file for complete search history.

(56) References Cited

U.S. PATENT DOCUMENTS

2020/0068440 A1* 2/2020 Talbert ................. H04W 72/10

FOREIGN PATENT DOCUMENTS

| JP | 2013-158028 A | 8/2013 |
| JP | 2017-038126 A | 2/2017 |
| JP | 2017-135517 A | 8/2017 |

OTHER PUBLICATIONS

Wi-Fi Alliance, Wi-Fi CERTIFIED EasyMesh Highlights [online], May 12, 2018, [retrieved on Oct. 1, 2019], Internet: <https://www.wi-fi.org/download.php?file=/sites/default/files/private/Wi-Fi_CERTIFIED_EasyMesh_Highlights.pdf>.

* cited by examiner

*Primary Examiner* — Jamal Javaid
(74) *Attorney, Agent, or Firm* — Canon U.S.A., Inc. IP Division

(57) ABSTRACT

A communication apparatus that operates as an access point constructing a wireless LAN receives a selection instruction for operating as a controller configured to control another access point in a network including at least one or more access points and determines, based on comparison between a controller selection method used in the selection instruction and a controller selection method used in another communication apparatus already operating as a controller, whether to change an apparatus that is to operate as the controller from the other communication apparatus to the communication apparatus.

9 Claims, 10 Drawing Sheets

FIG.4

Controller Selection Response TLV format

| Field | Length | Value | Description |
|---|---|---|---|
| tlvType | 1 octet | 0xXX | Controller Selection Response TLV. |
| tlvLength | 2 octets | 1 | Number of octets in ensuing field. |
| tlvValue | 1 octet | 0x00: END-USER DESIGNATION<br>0x01: SERVICE PROVIDER DESIGNATION<br>0x02: AUTOMATIC SELECTION ALGORITHM<br>0x03 – 0xFF: Reserved | MULTI-AP CONTROLLER SELECTION METHOD |

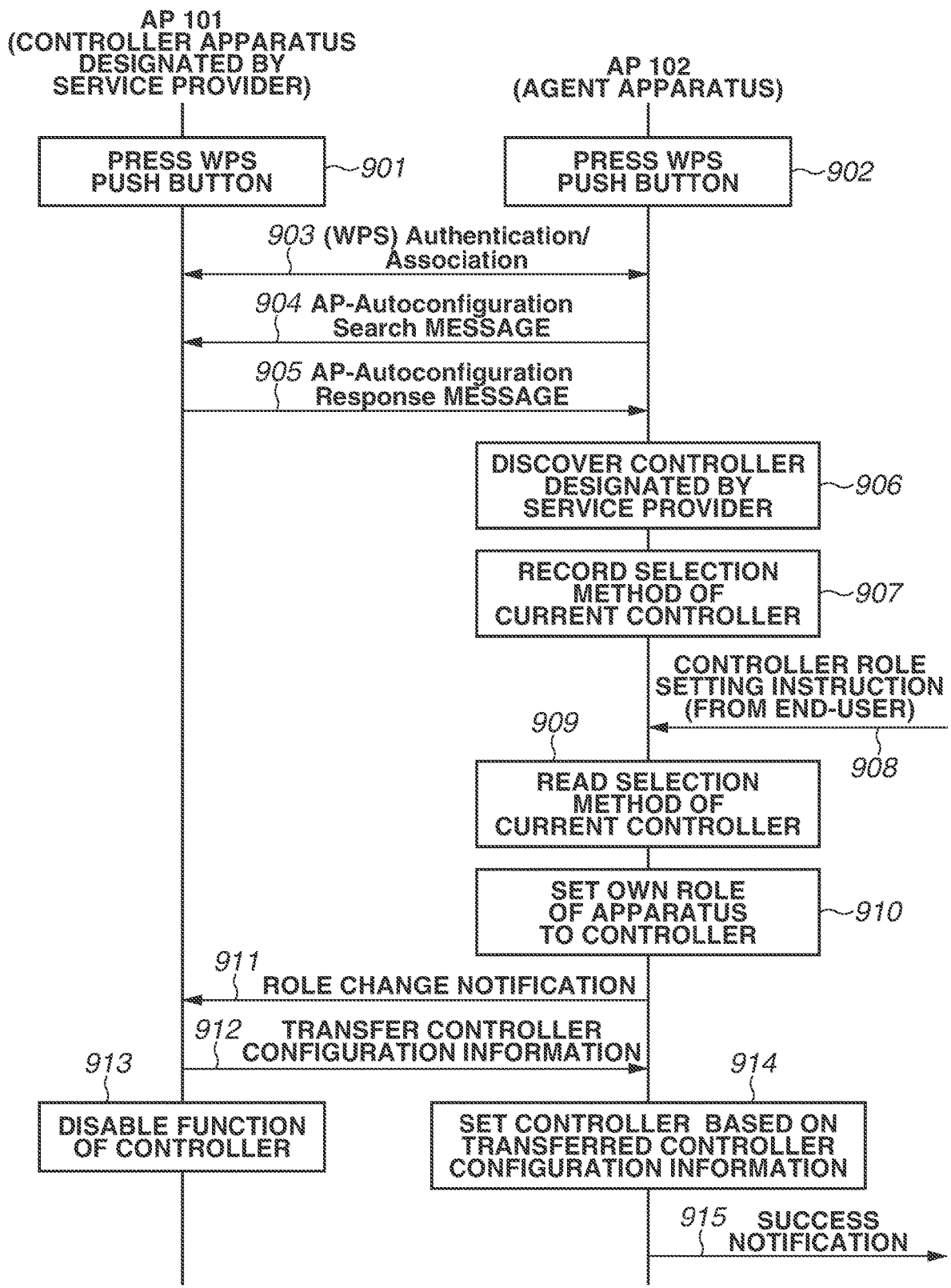

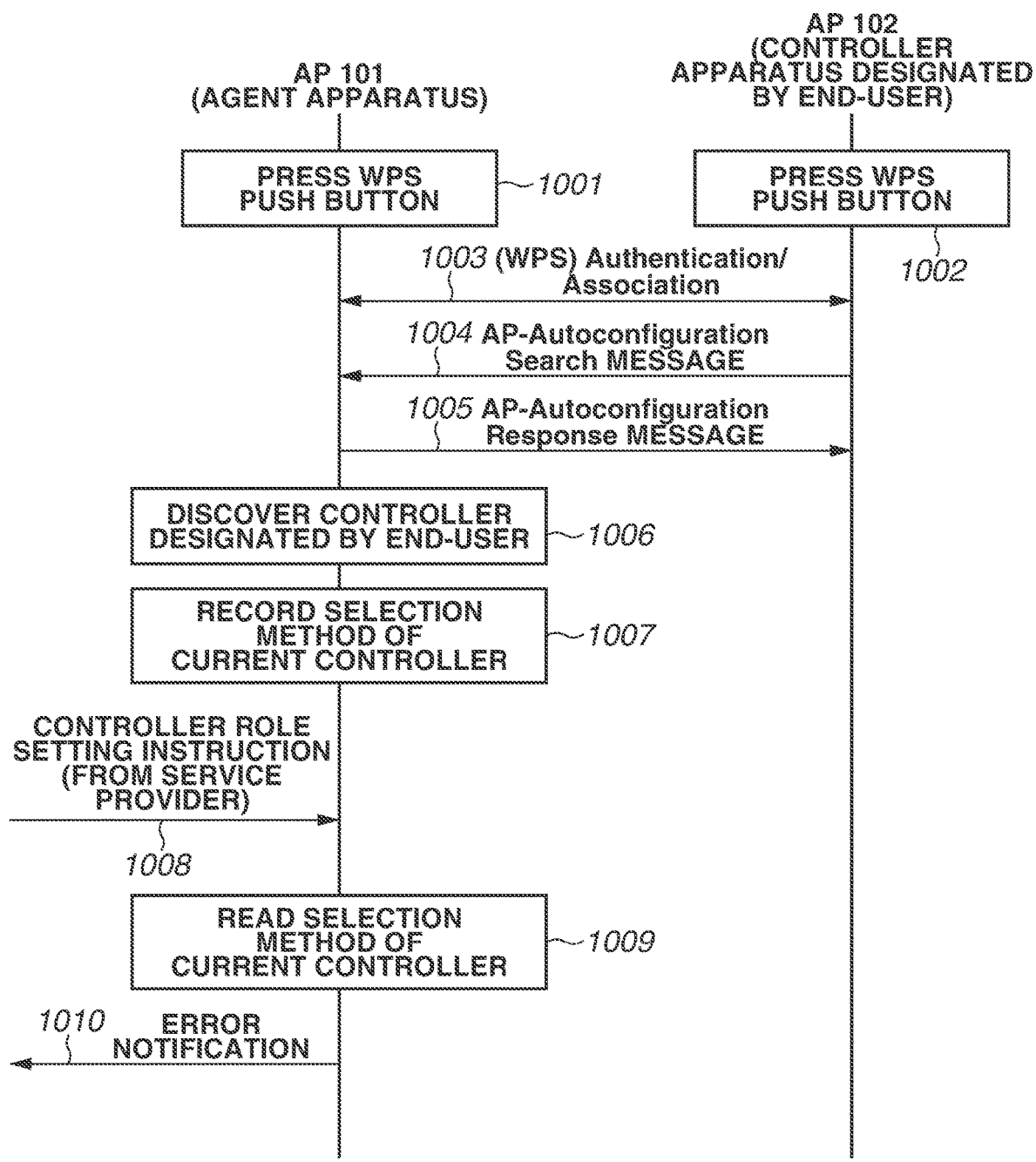

COMMUNICATION APPARATUS, CONTROL METHOD OF COMMUNICATION APPARATUS, AND COMPUTER-READABLE STORAGE MEDIUM

CROSS-REFERENCE TO RELATED APPLICATIONS

This application is a Continuation of International Patent Application No. PCT/JP2019/035673, filed Sep. 11, 2019, which claims the benefit of Japanese Patent Application No. 2018-182090, filed Sep. 27, 2018, both of which are hereby incorporated by reference herein in their entirety.

BACKGROUND OF THE INVENTION

Field of the Invention

The present invention relates to a communication apparatus that operates as an access point of a wireless LAN, a control method of a communication apparatus, and a computer-readable storage medium.

Background Art

The Wi-Fi EasyMesh (registered trademark) standard formulated by the Wi-Fi Alliance is a standard defining various types of control in a network (hereinafter, multi-AP network) comprised of one or more access points (hereinafter, APs). In the Wi-Fi EasyMesh standard, an AP included in the multi-AP network obtains various types of information regarding another AP, and implements efficient network control between a plurality of APs using the information. The multi-AP network includes a multi-AP controller (hereinafter, controller) and a multi-AP agent (hereinafter, agent). The controller is an AP that controls the entire multi-AP network by controlling another AP. The agent is an AP that notifies the controller of network information under the control of the controller. The controller issues an instruction to the agent and controls the multi-AP network based on network topology information, discovery information, and the like that are received from the agent using a protocol defined by the IEEE 1905.1 standard. In addition, the controller performs proxy control of data communication between the multi-AP network and a public network, and manages data traffic.

PTL1 discloses a technique for efficiently distributing communication load in a plurality of APs. In PTL1, a connection control apparatus obtains communication load information in a plurality of APs and transmits a connection prohibition command or a connection command to an AP based on the communication load information.

CITATION LIST

Patent Literature

PTL1: Japanese Patent Laid-Open No. 2017-038126

The Wi-Fi EasyMesh standard defines that one controller exists on a multi-AP network, but does not define a specific selection method of the controller. In addition, a method of changing an AP playing a role of a controller to another AP is not defined therein, either. Thus, if a role as a controller is set to each of a plurality of APs on a multi-AP network, it causes a problem that a plurality of controllers exists on one multi-AP network.

SUMMARY OF THE INVENTION

The present invention has been devised for solving the problem, and can prevent a plurality of access points from operating as a controller that controls another access point and more appropriately determine an access point that operates as a controller.

To obtain the above-described objective, a communication apparatus according to the present invention is a communication apparatus, which operates as an access point constructing a wireless LAN, comprises a reception unit configured to receive a selection instruction for operating as a controller configured to control another access point in a network including at least one or more access points, an identification unit configured to identify a controller selection method used in the selection instruction received by the reception unit, a search unit configured to search for another communication apparatus already operating as a controller in the network, an obtainment unit configured to obtain, from another communication apparatus discovered by the search unit, information indicating a controller selection method used in the other communication apparatus, and a determination unit configured to determine whether to change an apparatus that is to operate as the controller from the other communication apparatus to the communication apparatus based on comparison between the controller selection method identified by the identification unit and the controller selection method indicated by the information obtained by the obtainment unit.

Further features of the present invention will become apparent from the following description of exemplary embodiments (with reference to the attached drawings).

BRIEF DESCRIPTION OF THE DRAWINGS

FIG. 4 is a diagram illustrating an example of an extended format of a search response message.

FIG. 9 is a diagram illustrating a control sequence between communication apparatuses according to the second exemplary embodiment.

FIG. 10 is a diagram illustrating a control sequence between communication apparatuses according to the second exemplary embodiment.

DESCRIPTION OF THE EMBODIMENTS

Figure 1:
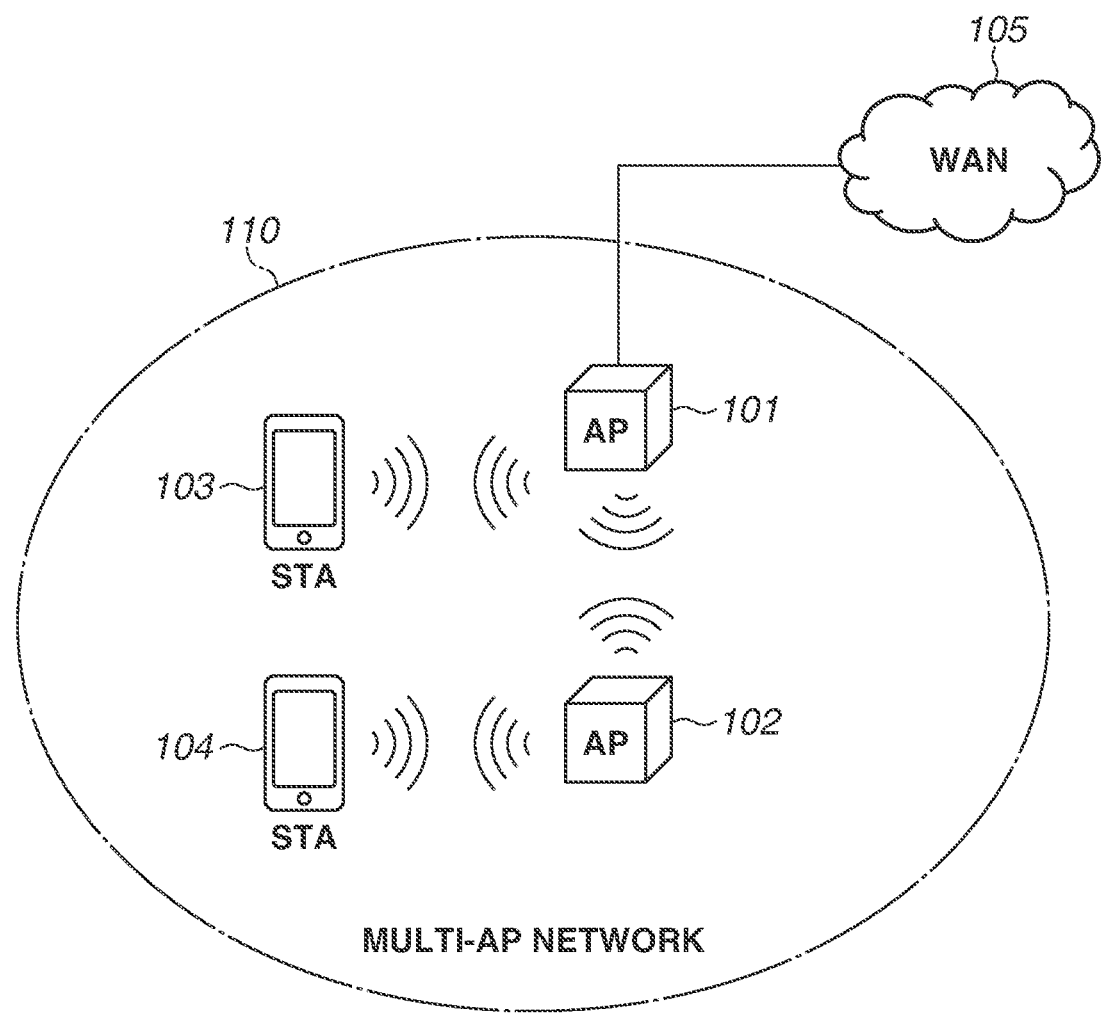
FIG. 1 is a diagram illustrating a network configuration of a communication system according to a first exemplary embodiment.

Hereinafter, exemplary embodiments of the present invention will be described in detail based on several examples with reference to the attached drawings. Configurations described in the following exemplary embodiments are mere examples, and the present invention is not limited to the configurations illustrated in the drawings.

First Exemplary Embodiment

FIG. 1 illustrates a network configuration of a communication system according to the present exemplary embodiment. Communication apparatuses 101 to 104 perform wireless communication on a multi-AP network 110.

The communication apparatuses 101 and 102 are apparatuses each operating as an AP constructing a wireless LAN conforming to the IEEE 802.11 series standard. The communication apparatuses 103 and 104 are apparatuses each operating as a station (hereinafter, STA) connecting to a wireless LAN constructed by the AP(s) 101 and/or 102. In addition, the communication apparatus 101 is connected to a WAN 105 and can relay communication of the other communication apparatuses 102 to 104 and connect the other communication apparatuses 102 to 104 to the WAN. The communication apparatuses 101 and 102 may perform wired communication in addition to or in place of wireless communication.

Here, either one AP of the communication apparatuses 101 and 102 plays a role of a controller having a function of controlling the entire multi-AP network 110 by controlling the other AP. In addition, the other AP not playing a role of the controller plays a role of an agent having a function of notifying the controller of network information under the control of the controller. For example, the controller controls a connection channel and transmission power of the agent by transmitting a predetermined control message. Furthermore, the controller shifts the agent to a different BSS (basic service set), controls steering (roaming, etc.) of an STA, and performs control of data traffic, network diagnostic, and the like. On the other hand, the network information to be notified by the agent to the controller is, for example, capability information (HT Capability, VHT Capability, etc.) of an agent itself or capability information of an STA and an AP connecting to the agent. The AP connecting to the agent refers to an STA function of a multi-AP device called a Backhaul STA. Aside from these types of information, the network information may include information regarding a wireless LAN connection channel, information regarding radio wave interference, link information of an STA (connection or disconnection notification), information for notifying a change in topology, metrics information of a beacon frame, and the like. An AP playing a role of the controller may simultaneously have the function of the agent, and, in the present exemplary embodiment, the communication apparatuses 101 and 102 each have both the function of the controller and the function of the agent. The Wi-Fi EasyMesh standard defines that one controller exists on one multi-AP network. A plurality of agents may exist on one multi-AP network. In the present exemplary embodiment, the description will be therefore given assuming that either one AP of the communication apparatuses 101 and 102 operates as the controller and the other one operates as the agent.

Although specific examples of the communication apparatuses 101 and 102 include a wireless LAN router, a PC, a tablet terminal, a smartphone, a television, a printer, a copier, a projector, and the like, the communication apparatuses 101 and 102 are not limited to these as long as the communication apparatuses 101 and 102 include the hardware configurations and functional configurations described below.

Figure 2:
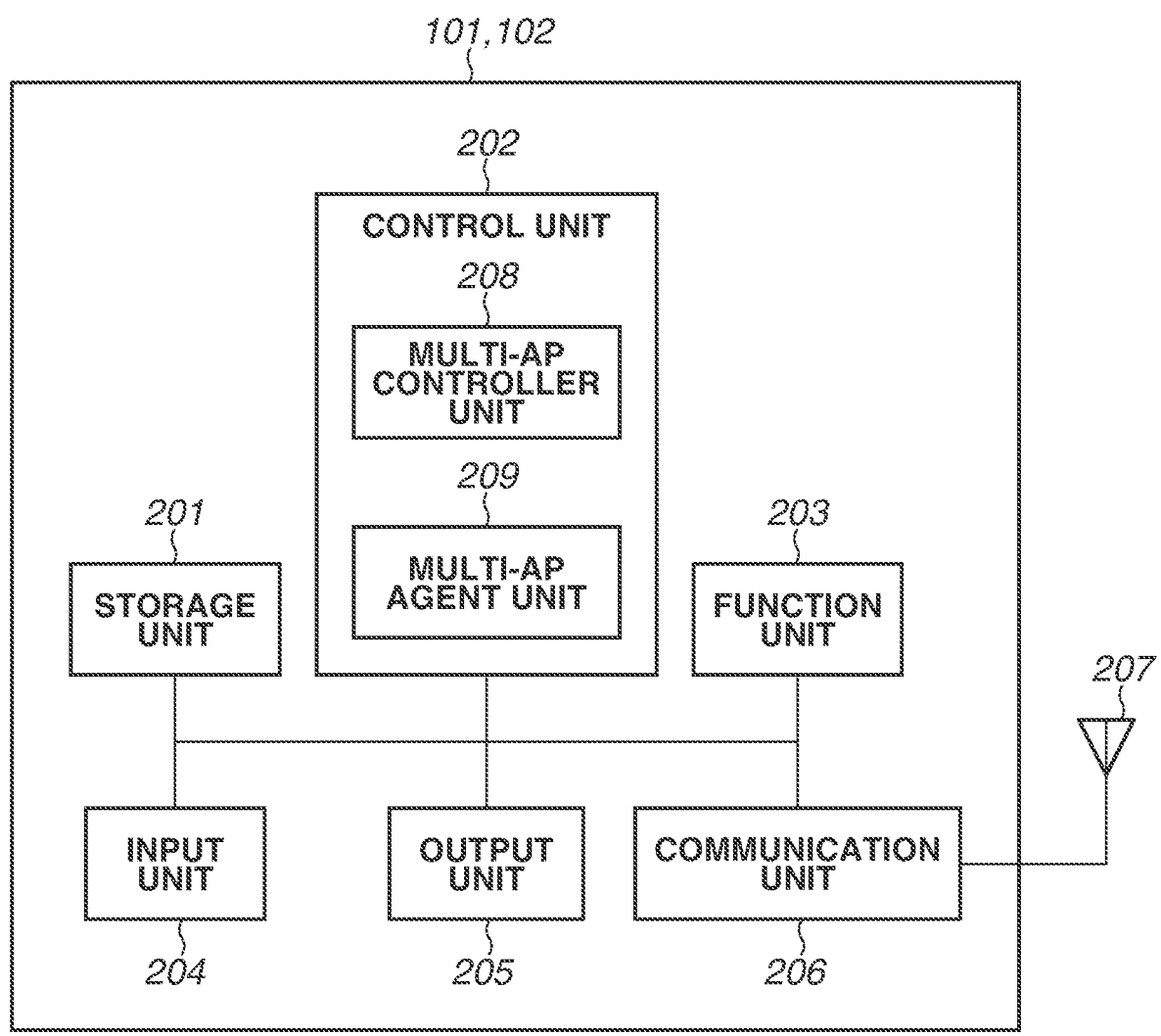
FIG. 2 is a diagram illustrating a functional configuration of a communication apparatus.

FIG. 2 illustrates a hardware configuration of the communication apparatus 101 (and the communication apparatus 102). The communication apparatus 101 includes a storage unit 201, a control unit 202, a function unit 203, an input unit 204, an output unit 205, a communication unit 206, and an antenna 207.

The storage unit 201 includes a memory such as a ROM or a RAM, and stores programs for performing the various operations described below, and information such as a communication parameter for wireless communication. Aside from a memory such as a ROM or a RAM, a storage medium such as a flexible disk, a hard disc, an optical disk, a magnetic optical disk, a CD-ROM, a CD-R, a magnetic tape, a nonvolatile memory card, or a DVD may be used as the storage unit 201. In addition, the storage unit 201 may include a plurality of memories and the like.

The control unit 202 includes a processor such as a CPU or an MPU, and controls the entire communication apparatus 101 by executing a program stored in the storage unit 201. In addition, among the programs stored in the storage unit 201 that function as a multi-AP controller unit 208 and a multi-AP agent unit 209, the control unit 202 executes at least one function determined in accordance with the setting or operation of the communication apparatus 101.

In a case where the communication apparatus 101 simultaneously plays the role of the controller and the role of the agent, both functions of the multi-AP controller unit 208 and the multi-AP agent unit 209 are enabled. In a case where the communication apparatus 101 only plays the role of the controller, that is, in a case where the communication apparatus 101 does not play the role of the agent, the function of the multi-AP controller unit 208 is enabled and the function of the multi-AP agent unit 209 is disabled. In contrast, in a case where the communication apparatus 101 only plays the role of the agent, that is, in a case where the communication apparatus 101 does not play the role of the controller, the function of the multi-AP controller unit 208 is disabled and the function of the multi-AP agent unit 209 is enabled. Using the function of the multi-AP controller unit 208, the communication apparatus 101 issues an instruction to the agent and controls a multi-AP network based on network topology information and discovery information that have been received from the agent. The topology information here is, for example, a 1905 Topology Notification message or a 1905 Topology Response message that is based on the Wi-Fi EasyMesh specification. The discovery information is, for example, a 1905 AP-Autoconfiguration Search message or a 1905 AP-Autoconfiguration Response message. These are messages that are based on the Wi-Fi EasyMesh specification. Based on these types of information, the controller can transmit a client association control request message defined as a multi-AP control message in the Wi-Fi EasyMesh specification. This can prohibit an STA from connecting to another BSS in a multi-AP network and explicitly perform steering (roaming) of the STA to a predetermined BSS, which allows efficient STA steering between BSSs. In a case where the communication apparatus 101 does not play the role of the controller, a functional configuration not including the multi-AP controller unit 208 may be employed.

The control unit 202 may control the entire communication apparatus 101 in cooperation with a program stored in the storage unit 201 and an OS (operating system). In addition, the control unit 202 may include a plurality of processors such as a multi-core processor and may control the entire communication apparatus 101 using the plurality of processors.

In addition, the control unit 202 executes predetermined processing such as printing and projection by controlling the function unit 203. The function unit 203 is hardware for the communication apparatus 101 to execute predetermined processing. For example, if the communication apparatus 101 is a printer, the function unit 203 is a printing unit and performs printing processing. Data to be processed by the function unit 203 may be data stored in the storage unit 201, or may be data obtained through communication with another communication apparatus via the communication unit 206, which will be described below.

The input unit 204 receives various operations from a user via a pointing device such as a mouse, a voice input, a button operation, or the like. The output unit 205 performs various outputs to the user. The output performed by the output unit 205 includes at least one of a display on an LED, display on a screen, voice output via a speaker, vibration output, and the like. Both the input unit 204 and the output unit 205 may be implemented by one module like a touch panel.

The communication unit 206 controls a wireless LAN conforming to the IEEE 802.11 series standard, which is a protocol of a data link layer and controls wired communication via a wired LAN or the like that is based on the IEEE 802.3 standard. Furthermore, the communication unit 206 controls IP communication, which is a communication protocol of a network layer. In addition, the communication unit 206 executes a protocol conforming to the IEEE 1905.1 standard and controls the controller and/or the agent in conformity to the Wi-Fi EasyMesh standard via communication conforming to the IEEE 802.11 standard or the IEEE 802.3 standard. The IEEE 1905.1 standard is a standard that defines a protocol positioned in a hierarchical layer between the data link layer and the network layer. Nevertheless, communication methods are not limited to these, and the configurations of the present exemplary embodiment can also be applied to a communication apparatus conforming to a different wireless communication method such as Bluetooth (registered trademark), NFC, UWB, ZigBee, or MBOA and a communication apparatus conforming to a different wired communication method. Here the MBOA stands for the Multi Band OFDM Alliance. In addition, the UWB includes a wireless USB, wireless 1394, WINET, and the like. In addition, the communication unit 206 transmits and receives a radio signal for wireless communication by controlling the antenna 207.

Figure 3:
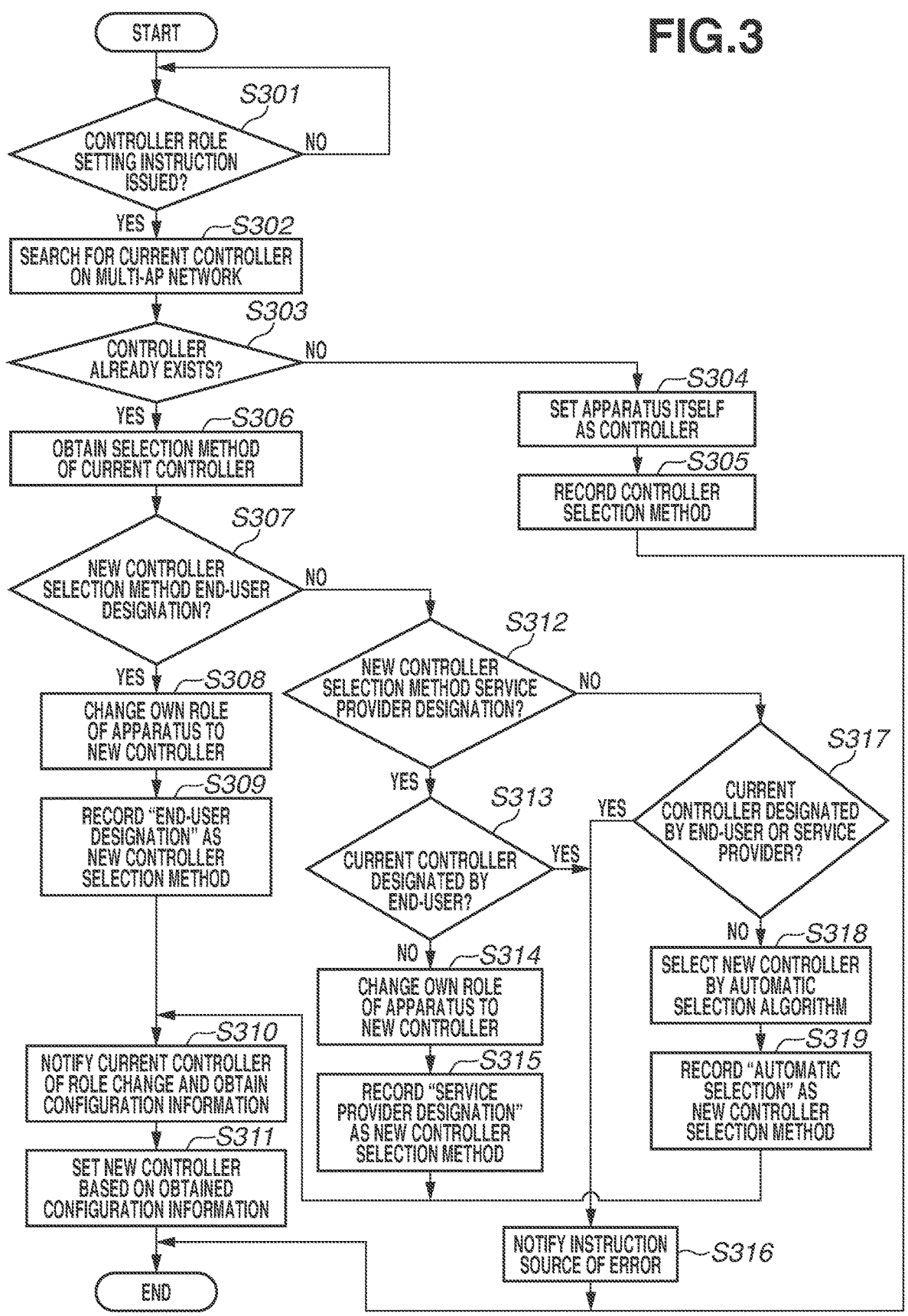
FIG. 3 is a flowchart illustrating processing executed in a communication apparatus.

FIG. 3 is a flowchart illustrating processing executed in the communication apparatus 101 when a selection instruction for operating as a controller of a multi-AP network is issued. Each step of the flowchart illustrated in FIG. 3 is implemented by the control unit 202 reading and executing a program stored in the storage unit 201. The communication apparatus 102 can similarly execute the processing illustrated in FIG. 3. In addition, at least part of the processing in the flowchart illustrated in FIG. 3 may be implemented by hardware. If implemented by hardware, for example, a dedicated circuit may be automatically generated on an FPGA from a program for implementing each step, using a predetermined compiler. The FPGA stands for a field programmable gate array. In addition, a gate array circuit may be formed in a similar manner to the FPGA to be implemented as hardware. In addition, the processing may be implemented by an ASIC (application specific integrated circuit).

First of all, the multi-AP controller unit 208 of the communication apparatus 101 determines whether a selection instruction for performing a setting of operating as a controller has been issued (step S301). If a user service provider change instruction has not been issued (NO in step S301), the processing returns to step S301 to wait until the change instruction is received.

As a result of determination in step S301, in a case where it is determined that a selection instruction for operating as a controller has been issued (YES in step S301), the multi-AP controller unit 208 searches for an AP already operating as a controller in a multi-AP network (step S302). As a search method, for example, multicast transmission of an AP-Autoconfiguration Search message defined by the IEEE 1905.1 standard is performed based on the Wi-Fi EasyMesh specification. Nevertheless, the search method is not limited to this method, and an arbitrary protocol and an arbitrary message may be used.

If an instruction for checking an AP on the multi-AP network that plays the role of the controller has been received in accordance with a user operation or the like, the communication apparatus 101 may perform search processing in step S302 before the processing in step S301. In this case, an output is produced using the output unit 205 in such manner that the user can recognize an AP that has been discovered to be already operating as a controller as a result of the search.

After performing the search processing in step S302, the multi-AP controller unit 208 of the communication apparatus 101 determines whether an AP already operating as a controller exists on the multi-AP network (step S303). The determination here can be performed based on whether a response (AP-Autoconfiguration Response message) to the AP-Autoconfiguration Search message transmitted in step S302 has been received, for example. If the response has not been received, the search processing in step S302 may be performed again for a predetermined period or predetermined number of times.

In a case where it is determined as a result of determination in step S303 that an AP operating as a controller does not exist on the multi-AP network (NO in step S303), the multi-AP controller unit 208 of the communication apparatus 101 sets the apparatus itself as a controller (step S304). The communication apparatus 101 set as a controller hereinafter functions as a controller on the multi-AP network.

After step S304, the multi-AP controller unit 208 of the communication apparatus 101 records, in the storage unit 201, a controller selection method used in the selection instruction received in step S301 (step S305) and ends the processing. Here the controller selection method is a method for issuing a selection instruction for operating as a controller of a multi-AP network to an AP. In the present exemplary embodiment, three types of controller selection methods exist. The first controller selection method is a method of selecting a controller based on the designation performed by a user (end-user). The second controller selection method is a method of selecting a controller based on the designation performed by a service provider. The third controller selection method is a method of selecting a controller by an automatic selection algorithm. In step S305, the communication apparatus 101 stores, in the storage unit 201, information indicating any one of the three methods that has been used as a controller selection method in the selection instruction received in step S301. In the method of selecting a controller based on the designation performed by a user, a selection instruction may be received based on an operation performed by the user on the input unit 204 of the communication apparatus 101, or a selection instruction may be received via the communication unit 206 from an external device such as a smartphone. In addition, for the designation performed by a service provider, a selection instruction may be received via the WAN 105 and the communication unit 206. The automatic selection algorithm may be an arbitrary algorithm as long as the algorithm is a method that can determine one controller. In a case where a controller stops the role of the controller by power OFF or the like, or in a case where a controller withdraws from the multi-AP network, a controller is newly selected by the automatic selection algorithm from among APs that have a controller function on the multi-AP network. In this manner, in a case where no controller is discovered on the multi-AP network, the role of an arbitrary AP can be set as a new controller.

In a case where it is determined as a result of determination in step S303 that an AP operating as a controller exists on the multi-AP network, the processing proceeds to step S306. In step S306, the communication apparatus 101 obtains information indicating a controller selection method used in an AP operating as a controller from the AP. As an obtainment method, for example, the communication apparatus 101 obtains the information from the AP-Autoconfiguration Response message received at the time of the above-described search for a controller. Alternatively, another message for inquiring about a selection method may be transmitted to a controller discovered as a result of the search, and the information may be obtained from a response to the inquiry.

FIG. 4 illustrates an example of an extended format of the AP-Autoconfiguration Response message used for the notification of a controller selection method in the present exemplary embodiment. A Controller Selection Response TLV (type-length-value) format is a format unique to the Wi-Fi EasyMesh standard. The Controller Selection Response TLV format includes three fields of tlvType, tlvLength, and tlvValue. In addition, the Controller Selection Response TLV format is used in a response to an AP-Autoconfiguration Search message from a multi-AP agent. Although, in the present exemplary embodiment, the respective lengths of the fields are defined as 1 octet, 2 octets, and 1 octet as illustrated in the figure, the format is not limited to these fields and field lengths.

In the tlvType field, a predetermined value indicating that the message is a Controller Selection Response TLV is set. The value in the tlvType field is a value that is defined for identifying the type of a multi-AP TLV format and is unique to each format, and an arbitrary value can be used in the present exemplary embodiment.

For the tlvLength field, as a value indicating the number of octets in an ensuing field and, in the present exemplary embodiment, the number of octets in the ensuing tlvValue field, 1 is set.

The tlvValue field corresponds to information for identifying a controller selection method. The tlvValue field indicates a controller selected based on end-user designation in a case where the value is 0x00, a controller selected based on service provider designation in a case where the value is 0x01, and a controller selected by the automatic selection algorithm in a case where the value is 0x02. Values from 0x03 to 0xFF are reserved for defining designation methods other than these in the future. In the present exemplary embodiment, the description will be given assuming that, among the controller selection methods, the end-user designation, the service provider designation, and the automatic selection algorithm are in the descending order of priority. Nevertheless, the selection method is not limited to this as long as common definition is made on the multi-AP network, and the selection of a controller can be controlled based on an arbitrary selection method and an arbitrary priority order. In addition, each field value of the Controller Selection Response TLV format is not limited to the above-described value and an arbitrary value can be used if it is configured to include information for identifying a selection method of a controller. A notification method is not limited to a notification method that uses a Controller Selection Response, and an arbitrary notification method may be used. In this manner, in the present exemplary embodiment, an AP-Autoconfiguration Response message defined by the IEEE 1905.1 standard is extended to include information regarding a controller selection method and is used for the notification of a controller selection method.

The description will return to FIG. 3. In step S307, the multi-AP controller unit 208 of the communication apparatus 101 determines whether the controller selection method (hereinafter, new controller selection method) used in the selection instruction received in step S301 is a controller selection method that is based on end-user designation.

In a case where it is determined as a result of determination in step S307 that a new controller selection method is end-user designation (YES in step S307), the multi-AP controller unit 208 of the communication apparatus 101 changes the role of the apparatus itself to a new multi-AP controller (step S308). As described above, a controller apparatus may simultaneously function as an agent, and, in this case, by enabling the function of the controller unit 208 while keeping the function of the agent unit 209 enabled, the function of the controller and the function of the agent are caused to simultaneously work. In this manner, in a case where a new controller selection method is end-user designation, a controller is changed with no condition irrespective of a controller selection method (hereinafter, current controller selection method) used in an AP already operating as a controller. In other words, even if the current controller is a controller selected based on end-user designation, the controller is changed by overwriting the setting based on subsequent end-user designation.

Subsequently, the multi-AP controller unit 208 of the communication apparatus 101 records "end-user designation" in the storage unit 201 as a new controller selection method (step S309). The recorded controller selection method is read out from the storage unit 201 and notified in a case where a controller search message or an inquiry about a controller selection method is received from the agent.

Furthermore, the multi-AP controller unit 208 of the communication apparatus 101 notifies the current multi-AP controller that the apparatus itself operates as a new multi-AP controller in succession to the current multi-AP controller. Then, the multi-AP controller unit 208 obtains controller configuration information (step S310). Although, as an obtainment method, various messages defined in the IEEE 1905.1 standard can be used, the method is not limited to one using the IEEE 1905.1 standard, and an arbitrary protocol and an arbitrary format may be also used. The controller configuration information includes at least one of an SSID, a channel setting, a password or certificate required for authentication and information such as agent management information, network topology information, and discovery information.

The multi-AP controller unit 208 of the communication apparatus 101 sets a new controller based on the obtained controller configuration information (step S311) and ends the processing. From this time, the communication apparatus 101 issues an instruction to the agent and controls the multi-AP network as a controller of the multi-AP network based on network topology information and discovery information that have been obtained from the agent.

On the other hand, in a case where it is determined as a result of determination in step S307 that a new controller selection method is not an end-user designation (NO in step S307), the multi-AP controller unit 208 determines whether a new controller selection method is a service provider designation (step S312).

In a case where it is determined as a result of determination in step S312 that a new controller selection method is a service provider designation (YES in step S312), the multi-AP controller unit 208 determines whether the current controller selection method is end-user designation (step S313). In a case where it is determined as a result of determination in step S313 that the current controller selection method is not an end-user designation (NO in step S313), the multi-AP controller unit 208 of the communication apparatus 101 changes the role of the apparatus to a new multi-AP controller (step S314).

Subsequently, the multi-AP controller unit 208 of the communication apparatus 101 records "service provider designation" in the storage unit 201 as a new controller selection method (step S315) and advances the processing to step S310. Because the recording method used herein is similar to the above-described method used in step S309, the detailed description will be omitted.

On the other hand, in a case where it is determined as a result of determination in step S313 that the current controller selection method is the end-user designation, the multi-AP controller unit 208 notifies an instruction source (service provider in this case) of the selection instruction received in step S301 of an error (step S316). As an error notification method, an error only needs to be notified as a response to the selection instruction received in step S301, and an arbitrary protocol and an arbitrary format can be used. The error notification may include detailed information such as the cause of the error.

As illustrated in steps S313 to S316, in a case where a new controller selection method is the service provider designation, a controller is changed unless the current controller selection method is the end-user designation. If the current controller selection method is the end-user designation, the processing is ended without changing the controller.

On the other hand, in a case where it is determined as a result of determination in step S312 that a new controller selection method is not a service provider designation, that is, in a case where a new controller selection method is an automatic selection algorithm (NO in step S312), the processing in step S317 is performed. In step S317, the multi-AP controller unit 208 of the communication apparatus 101 determines whether the current controller selection method is an end-user designation or service provider designation (step S317).

If it is determined as a result of determination in step S317 that the current controller selection method is neither end-user designation nor service provider designation (NO in step S317), the processing in step S318 is performed. In step S318, the multi-AP controller unit 208 of the communication apparatus 101 selects whether the apparatus itself operates as a new multi-AP controller by the automatic selection algorithm (step S318). Because an arbitrary method can be used as the automatic selection algorithm, the detailed description will be omitted.

Subsequently, the multi-AP controller unit 208 of the communication apparatus 101 records "automatic selection algorithm" in the storage unit 201 as a new controller selection method (step S319), and advances the processing to step S310. Since the recording method used herein is similar to the above-described method in step S309, the detailed description will be omitted.

In a case where it is determined as a result of determination in step S317 that the current controller selection method is an end-user designation or service provider designation (YES in step S317), the multi-AP controller unit 208 notifies the instruction source of the selection instruction received in step S301 of an error.

As illustrated in steps S316 to S319, if a new selection method is an automatic selection algorithm, a controller is changed only if the current controller selection method is the automatic selection algorithm as well. In a case where the current controller selection method is end-user designation or service provider designation, the processing is ended without changing the controller.

Figure 5:
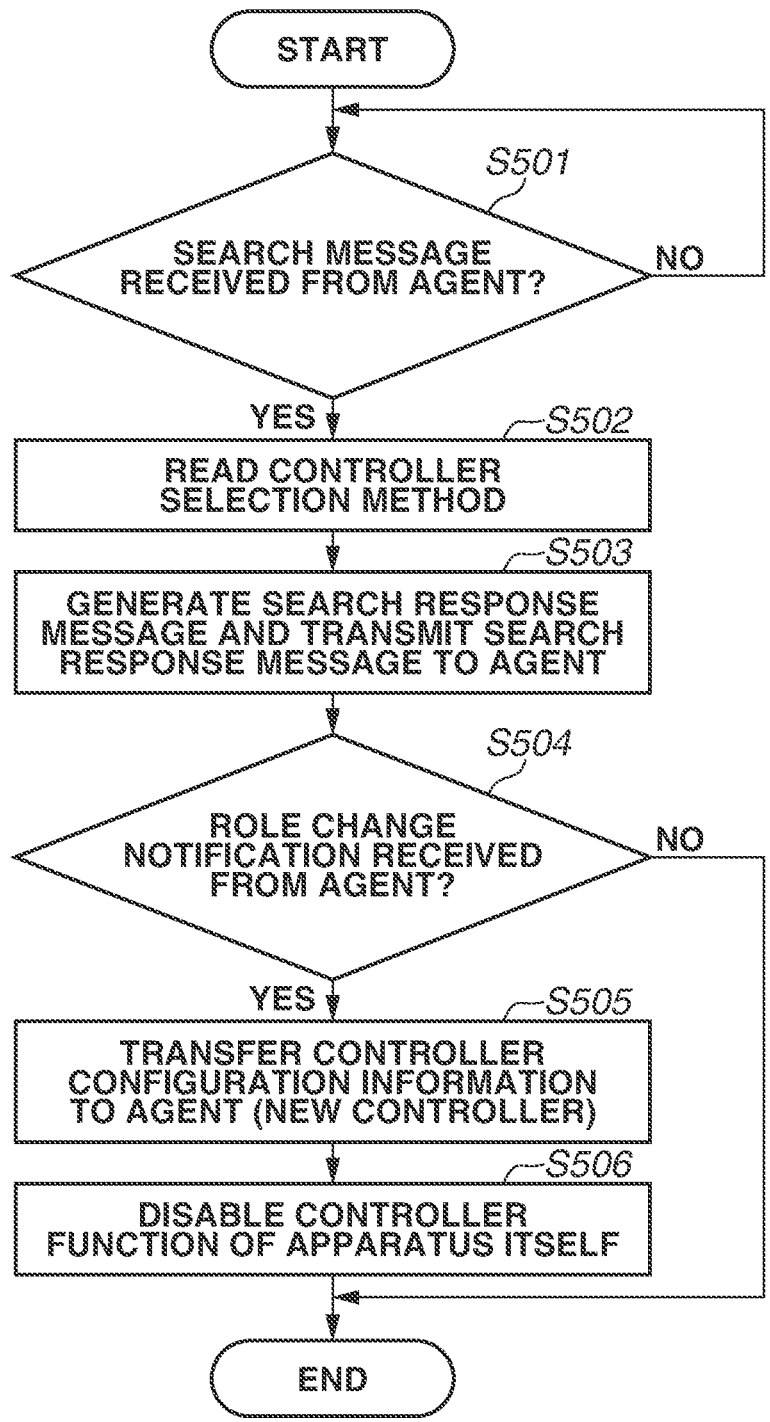
FIG. 5 is a flowchart illustrating processing executed in a communication apparatus.

FIG. 5 is a flowchart illustrating processing executed in the communication apparatus 101 in a case where the role of the controller is disabled. Each step of the flowchart illustrated in FIG. 5 is implemented by the control unit 202 reading and executing a program stored in the storage unit 201. The communication apparatus 102 can similarly execute the processing illustrated in FIG. 5. In addition, at least part of the flowchart illustrated in FIG. 5 may be implemented by hardware. In a case where the processing is implemented by hardware, for example, a dedicated circuit may be automatically generated on an FPGA from a program for implementing each step, using a predetermined compiler. The FPGA stands for a field programmable gate array. In addition, similarly to the FPGA, a gate array circuit may be formed and implemented as hardware. In addition, the processing may be implemented by an ASIC (application specific integrated circuit).

First of all, the multi-AP controller unit 208 of the communication apparatus 101 determines whether a search message has been received from an agent (step S501). As described above, for example, the Wi-Fi EasyMesh standard defines that multicast transmission of an AP-Autoconfiguration Search message defined by the IEEE 1905.1 standard is performed as a search message. Thus, the determination here can be performed by determining whether this message has been received. The search message is not limited to this message, and an arbitrary protocol and an arbitrary message can be used.

In a case where it is determined as a result of determination in step S501 that a search message has not been received from an agent (NO in step S501), the multi-AP controller unit 208 of the communication apparatus 101 returns the processing to step S501 to wait until a search message is received.

On the other hand, in a case where it is determined as a result of determination in step S501 that a search message has been received from an agent (YES in step S501), the multi-AP controller unit 208 of the communication apparatus 101 reads the controller selection method recorded in the storage unit 201 (step S502). The controller selection method is information recorded in the storage unit 201 in any of steps S305, S309, S315 and S319 described above for the apparatus to operate as a controller.

Subsequently, the multi-AP controller unit 208 of the communication apparatus 101 generates a search response message based on the controller selection method read in step S502, and transmits the generated search response message to the agent (step S503). The transmission destination of the search response message is the agent that has transmitted the search message in step S501 described above. For the search response message, example, the extended format of the AP-Autoconfiguration Response message illustrated in FIG. 4 is used.

Furthermore, the multi-AP controller unit 208 of the communication apparatus 101 determines whether a role change notification has been received from the agent to which the search response message has been transmitted (step S504). The role change notification is issued in a case where the role of a new AP is changed to a new multi-AP controller in succession to the current multi-AP controller, as described in step S310 described above. In a case where a role change notification has not been received, the multi-AP controller unit 208 may wait for a role change notification from the agent again for a predetermined period or predetermined number of times.

In a case where it is determined as a result of determination in step S504 that a role change notification has not been received from the agent (NO in step S504), the multi-AP controller unit 208 of the communication apparatus 101 ends the processing and continues to operate as a controller.

On the other hand, in a case where it is determined as a result of determination in step S504 that a role change notification has been received from the agent (YES in step S504), the multi-AP controller unit 208 transfers controller configuration information to an AP that starts to operate as a new multi-AP controller (step S505). Because the detailed descriptions of the transfer method and the controller configuration information have already been given in step S310, the descriptions will be omitted here. In the present exemplary embodiment, the controller transfers the controller configuration information in response to the role change notification from the agent. Nevertheless, the transfer method of the controller configuration information is not limited this, and a controller apparatus may transfer controller configuration information at an arbitrary timing, or another agent that manages the controller configuration information may transfer the controller configuration information in place of the controller.

Lastly, the multi-AP controller unit 208 of the communication apparatus 101 disables the multi-AP controller function of the apparatus and ends the processing (step S506). In a case where the communication apparatus 101 functions as both of the controller and the agent, only the function of the controller is stopped and the function of the agent is continued.

As a result of the processing in the flowchart illustrated in FIG. 5, the communication apparatus 101 can transfer controller configuration information to an AP that operates as a new controller on a multi-AP network and can disable the controller function of the apparatus.

Subsequently, control processing of the entire system of the communication apparatuses 101 and 102 according to the present exemplary embodiment will be described with reference to FIGS. 6 and 7.

Figure 6:
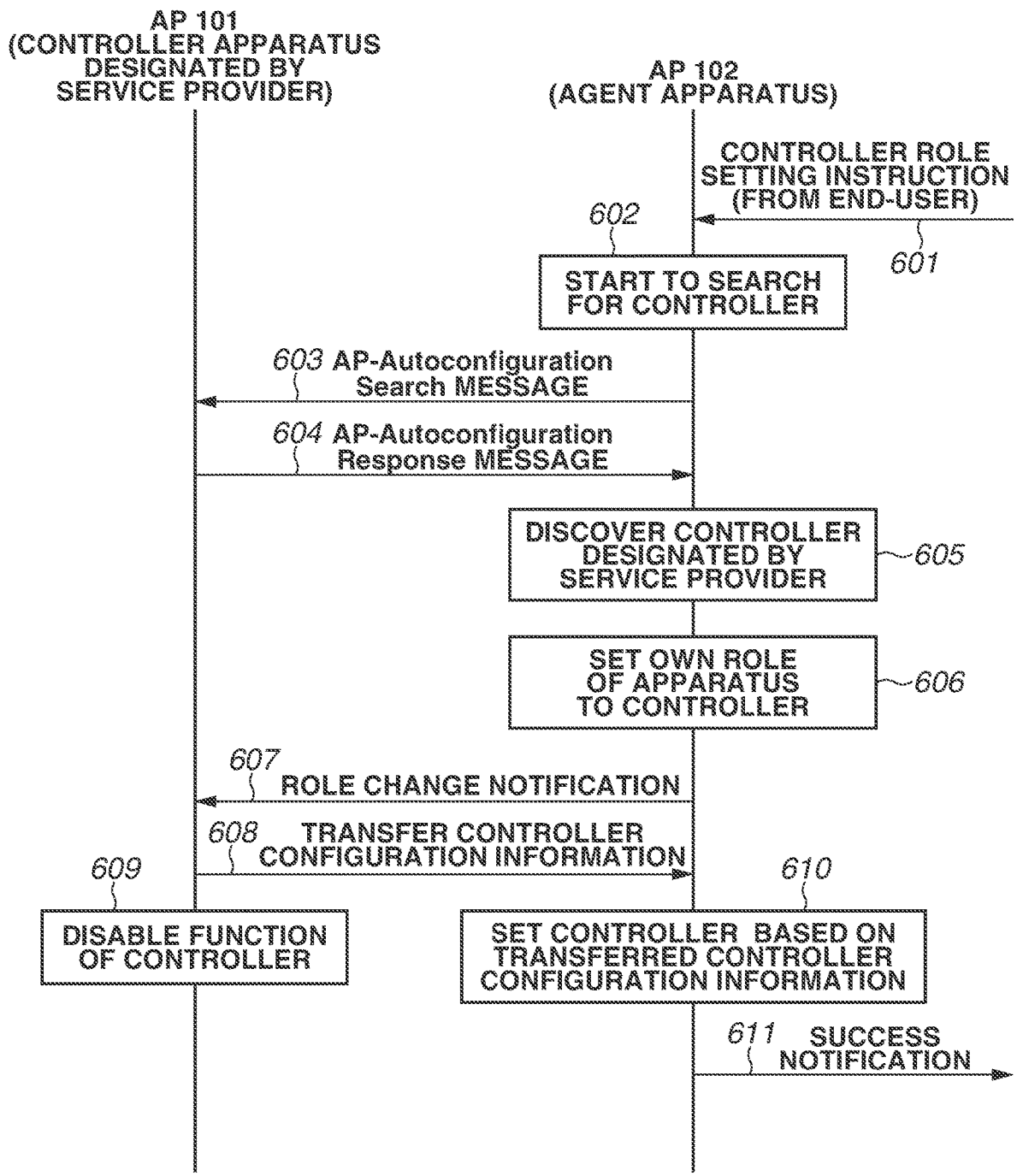
FIG. 6 is a diagram illustrating a control sequence between communication apparatuses.

FIG. 6 illustrates a control sequence performed in a case where a controller is changed based on end-user designation from a controller for which service provider designation has been used as a controller selection method. In FIG. 6, the AP 101 is selected and instructed by a service provider and set to function as a controller, and the AP 102 is preliminarily set to function as an agent.

In response to a controller role setting instruction from an end-user (step 601), the AP 102 starts to search for the current controller on the multi-AP network (step 602).

As a controller search sequence, the APs 101 and 102 transmit and receive an AP-Autoconfiguration Search message (step 603) and an AP-Autoconfiguration Response message (step 604). The AP-Autoconfiguration Response message (step 604) is in the extended format of the AP-Autoconfiguration Response message illustrated in FIG. 4. Upon receipt of the AP-Autoconfiguration Response message from the AP 101 (step 604), the AP 102 discovers the AP 101, which is a controller designated by the service provider (step 605).

Subsequently, the AP 102 determines that the controller is to be changed based on the fact that a controller selection method of the AP 101 being the current controller is service provider designation and that a controller selection method in the apparatus itself is an end-user designation. Then, the AP 102 sets the role of the apparatus itself as a controller (step 606).

The AP 102 to which the role as a controller is set notifies that the apparatus has changed its role to a controller (step 607).

The AP 101 that has received the role change notification from the AP 102 (step 607) transfers controller configuration information to the AP 102 (step 608), and disables the role as a controller of the apparatus itself (step 609). In a case where the AP 101 functions as both the controller and the agent, only the function of the controller is stopped, and the function of the agent may be continued.

On the other hand, the AP 102 performs setting of a controller based on the controller configuration information obtained from the AP 101 (610) and functions as a new multi-AP controller.

Lastly, the AP 102 notifies that the controller role setting instruction (step 601) has succeeded by presenting display to an end-user that is an instruction source, or the like (611).

In this manner, even if a controller designated by a service provider exits on a multi-AP network, an end-user can set an apparatus selected by himself, as a new controller. In addition, by taking over configuration information from the current controller, it is possible to save the user trouble in newly performing various settings for a new controller.

FIG. 6 illustrates an example in which the AP 101 is preliminarily set by an operator of a service provider to function as a controller. In a similar manner, in a case where the AP 101 is preliminarily set by an automatic selection algorithm to function as a controller, an end-user can select an apparatus selected by himself as a new controller.

Figure 7:
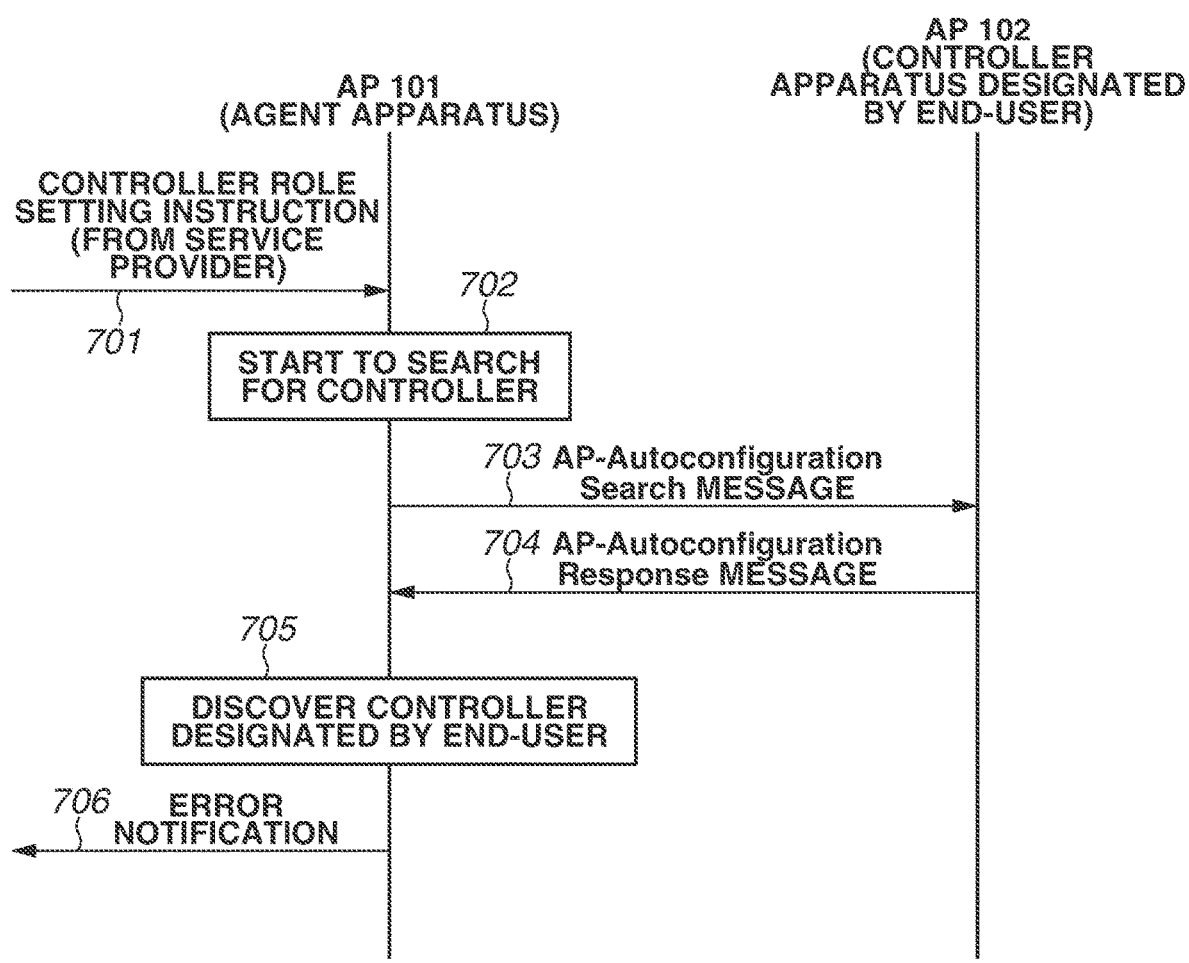
FIG. 7 is a diagram illustrating a control sequence between communication apparatuses.

Subsequently, FIG. 7 illustrates a control sequence performed in a case where a controller is changed based on service provider designation from a controller for which end-user designation has been used as a controller selection method. Unlike the sequence illustrated in FIG. 6, in FIG. 7, the AP 101 is preliminarily set to function as an agent, and the AP 102 is selected and instructed by an end-user and preliminarily set to function as a controller.

In response to a controller role setting instruction from a service provider (step 701), the AP 101 starts to search for the current controller on the multi-AP network (step 702).

As a controller search sequence, the APs 101 and AP 102 transmit and receive an AP-Autoconfiguration Search message (step 703) and an AP-Autoconfiguration Response message (step 704). The AP-Autoconfiguration Response message (step 704) is in the extended format of the AP-Autoconfiguration Response message illustrated in FIG. 4. By receiving the AP-Autoconfiguration Response message from the AP 102 (step 704), the AP 101 discovers the AP 102 that is a controller designated by an end-user (step 705).

Subsequently, based on the fact that a controller selection method of the AP 102 being the current controller is an end-user designation and that a controller selection method in the apparatus itself is service provider designation, the AP 101 determines that the controller is not to be changed. Then, the AP 101 notifies the service provider being an instruction source that the received controller role setting instruction (step 701) has failed (step 706).

In this manner, in a case where a controller designated by an end-user exists on the multi-AP network, a service provider cannot set an apparatus selected by itself, as a new controller. In other words, it is possible to prevent the setting of a controller designated by an end-user from being involuntarily changed by a service provider existing on the outside of the multi-AP network.

FIG. 7 illustrates an example in which the AP 101 receives a controller role setting instruction from an operator of a service provider. In a similar manner, in a case where a setting instruction to function as a controller is received by the automatic selection algorithm, it is also possible to prevent the setting of a controller designated by an end-user from being involuntarily changed. In this case, a failure in the controller role setting instruction (step 701) is notified by being output to the output unit 205 of the AP 101.

As described above, according to the present exemplary embodiment, it is possible to prevent a plurality of controllers from simultaneously existing on a multi-AP network. In addition, the respective controller selection methods of an apparatus that is to newly operate as a controller and an apparatus already operating as a controller are identified, the identified controller selection methods are compared to determine an AP set using a controller selection method with higher priority as a controller. With this configuration, it becomes possible to more appropriately determine an AP that operates as a controller.

Second Exemplary Embodiment

In the first exemplary embodiment, it is configured such that the current controller is searched for upon receiving a controller role setting instruction, and information regarding a controller selection method of the current controller that is included in a search response message received from the current controller is obtained. In contrast to this, in the present exemplary embodiment, the description will be given of an example in which a search response message received from a controller at the time of joining a multi-AP network is recorded and information regarding a controller selection method that is included in the recorded search response message is obtained. Since the functional configuration of a communication apparatus according to the present exemplary embodiment is similar to that of the communication apparatus 101 (and the communication apparatus 102) according to the first exemplary embodiment, the description will be omitted.

Figure 8:
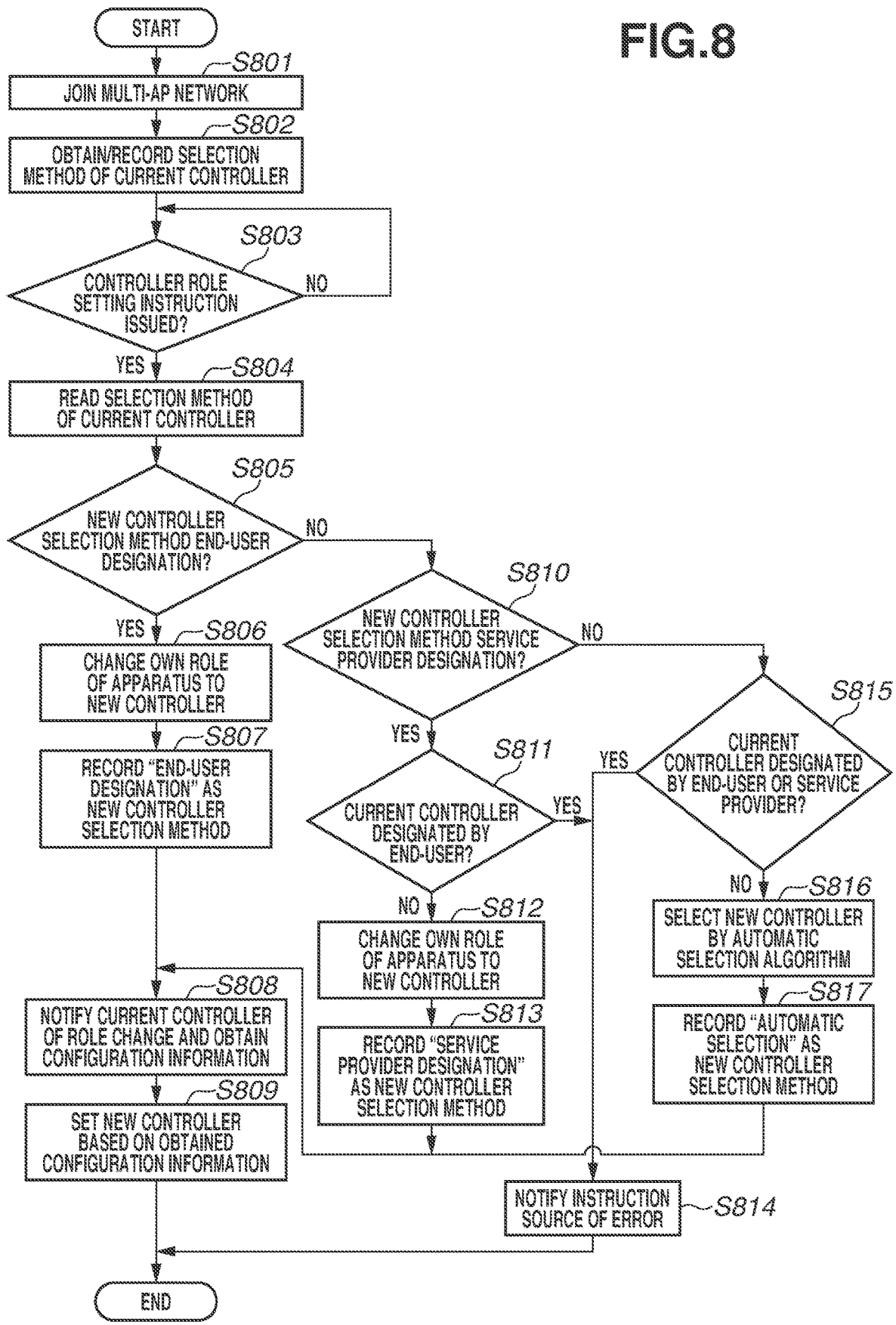
FIG. 8 is a flowchart illustrating processing executed in a communication apparatus according to a second exemplary embodiment.

FIG. 8 is a flowchart illustrating processing executed in a case where the role of the communication apparatus 101 operating as an agent is changed to a controller. Each step in FIG. 8 is implemented by the multi-AP controller unit 208 and the multi-AP agent unit 209 of the control unit 202 reading and executing a program stored in the storage unit 201 of the communication apparatus 101. Because the processing in steps S805 to S817 in FIG. 8 is similar to the processing in steps S307 to S319 of FIG. 3, the description will be omitted. The communication apparatus 102 can similarly execute the processing illustrated in FIG. 8. In addition, at least part of the flowchart illustrated in FIG. 8 may be implemented by hardware. In a case where the processing is implemented by hardware, for example, a dedicated circuit may be automatically generated on an FPGA from a program for implementing each step by using a predetermined compiler, for example. The FPGA stands for a field programmable gate array. In addition, a gate array circuit may be formed and implemented as hardware similarly to the FPGA. In addition, the processing may be implemented by an ASIC (application specific integrated circuit).

First of all, the multi-AP agent unit 209 of the communication apparatus 101 joins the multi-AP network 110 in response to an instruction from the user (step S801). As a method of joining the multi-AP network, for example, the Wi-Fi Protected Setup (hereinafter, WPS) can be used based on the Wi-Fi EasyMesh specification. Alternatively, a device provisioning protocol (hereinafter, DPP) may be used. The WPS and the DPP are standards formulated by the Wi-Fi Alliance and are standards for easily setting communication parameters necessary for wireless LAN connection, such as an SSID and an encryption key, in a communication apparatus. The method of joining the multi-AP network is not limited to these methods and protocols.

The multi-AP agent unit 209 of the communication apparatus 101 obtains and records a controller selection method used by the current controller (step S802). Here, the multi-AP agent unit 209 obtains the controller selection method from a search response message received from a controller at the time of joining the multi-AP network and records the obtained controller selection method in the storage unit 201. Because a method of searching for a controller at the time joining the multi-AP network is similar to the method in step S302 of FIG. 3, the description will be omitted.

Subsequently, the multi-AP controller unit 208 of the communication apparatus 101 determines whether a selection instruction for operating as a controller has been issued (step S803). Because the processing in this step is similar to the processing in step S301 of FIG. 3, the description will be omitted.

In a case where it is determined as a result of determination in step S803 that a selection instruction for operating as a controller has been issued (YES in step S803), the multi-AP controller unit 208 reads the controller selection method used by the current controller from the storage unit 201 (step S804). Here, the controller selection method recorded in step S802 described above is read from the storage unit 201. The controller selection method read in this step is used for determination in subsequent steps S811 and S815.

Subsequently, control processing of the entire system of the communication apparatuses 101 and 102 according to the present exemplary embodiment will be described with reference to FIGS. 9 and 10.

FIG. 9 illustrates a control sequence performed in a case where a controller is changed based on end-user designation from a controller for which service provider designation is used as a controller selection method. In FIG. 9, the AP 101 is selected and instructed by a service provider and set to function as a controller, and the AP 102 is preliminarily set to function as an agent. In a case where an AP is activated as a controller or an agent, a predetermined function is started up based on the Wi-Fi EasyMesh specification. For example, if an AP is activated as an agent, an STA function of a multi-AP device called a Backhaul STA is started up for joining the multi-AP network, and processing of joining the network is started. On the other hand, if an AP is activated as a controller, an AP function of a multi-AP device called a Fronthaul AP is started up, and the AP waits for connection from another STA apparatus or a Backhaul STA activated in another AP.

First of all, in response to a user operation corresponding to pressing of a WPS push button (steps 901, 902), the AP 102 serving as an agent starts to join the multi-AP network.

In the sequence of joining the multi-AP network, a wireless frame, such as WPS Authentication or WPS Association, is transmitted and received between the APs 101 and 102 based on the Wi-Fi EasyMesh specification (step 903). Furthermore, an AP-Autoconfiguration Search message (step 904) and an AP-Autoconfiguration Response message (step 905) are transmitted and received between the APs 101 and 102.

The AP-Autoconfiguration Response message (step 905) is in the extended format of the AP-Autoconfiguration Response message illustrated in FIG. 4. By receiving the AP-Autoconfiguration Response message from the AP 101 (step 905), the AP 102 discovers the AP 101 for which service provider designation is used as a controller selection method (step 906). Furthermore, the controller selection method (service provider designation in this case) of the current controller (the AP 101) is stored in a storage device (step 907).

In addition, in response to a selection instruction for operating as a controller from an end-user (step 908), the AP 102 reads the controller selection method of the current controller (the AP 101) from the storage device (step 909) and advances the processing to the subsequent sequence.

Because the sequence from (step 910) to (step 915) of FIG. 9 is similar to the sequence from (step 606) to (step 611) of FIG. 6, the detailed description will be omitted.

FIG. 9 illustrates an example in which the AP 101 is preliminarily set by an operator of a service provider to function as a controller. In a similar manner, in a case where the AP 101 is preliminarily set by an automatic selection algorithm to function as a controller, an end-user can select an apparatus selected by himself as a new controller.

Subsequently, FIG. 10 illustrates a control sequence performed in a case where a controller is changed based on service provider designation from a controller for which end-user designation is used as a controller selection method. Unlike the sequence illustrated in FIG. 9, in FIG. 10, the AP 101 is set to function as an agent, and the AP 102 is selected and instructed by an end-user and preliminarily set to function as a controller.

First of all, in response to a user operation corresponding to pressing of a WPS push button (steps 1001, 1002), the AP 101 serving as an agent starts to join the multi-AP network.

In the sequence of joining the multi-AP network, similarly to the sequence (steps 903 to 905) of FIG. 9, a wireless frame, such as WPS Authentication or WPS Association, is transmitted and received between the APs 101 and 102 (step 1003). In addition, an AP-Autoconfiguration Search message (step 1004) and an AP-Autoconfiguration Response message (step 1005) are transmitted and received between the APs 101 and 102.

The AP-Autoconfiguration Response message (step 1005) is in the extended format of the AP-Autoconfiguration Response message illustrated in FIG. 4. By receiving the AP-Autoconfiguration Response message from the AP 102 (step 1005), the AP 101 discovers the AP 102 that is a controller designated by an end-user (step 1006). Then, the AP 101 records the controller selection method (end-user designation in this case) of the current controller (the AP 102) in a storage device (step 1007).

In addition, in response to a controller role setting instruction from a service provider (step 1008), the AP 101 reads the selection method of the current controller (the AP 102) from the storage device (step 1009). As a result, the AP 101 determines that the controller is not to be changed based on the fact that end-user designation is used as the controller selection method of the AP 102 being the current controller and that service provider designation is used as the controller selection method of the apparatus itself. Then, the AP 101 notifies the service provider being an instruction source that the received controller role setting instruction (step 1008) has failed (step 1010).

FIG. 10 illustrates an example in which the AP 101 receives a controller role setting instruction from an operator of a service provider. In a similar manner, in a case where a setting instruction for functioning as a controller is received by an automatic selection algorithm, it is also possible to prevent the setting of a controller designated by an end-user from being involuntarily changed. In this case, a failure in the controller role setting instruction (step 1008) is notified by being output to the output unit 205 of the AP 101.

As described above, in the present exemplary embodiment, it is configured such that a search response message received from a controller at the time of joining a multi-AP network is recorded, and information regarding a controller selection method that is included in the recorded search response message is obtained. As a result, it becomes unnecessary to newly search for the current controller at the time of a controller role setting instruction, and it is possible to perform controller determination processing further efficiently as compared with the first exemplary embodiment.

Other Exemplary Embodiments

In the above-described exemplary embodiments, three methods are exemplified as controller selection methods, but a method other than these methods may be used, and the priorities of the controller selection methods are not limited to the above-described order. In addition, the priorities of the controller selection methods may be changeable by the user.

In the above-described exemplary embodiments, as illustrated in FIG. 4, an apparatus already operating as a controller transmits information indicating a controller selection method, but information indicating the priority of a controller selection method may be transmitted as the information indicating a controller selection method. The information indicating a controller selection method that is to be transmitted is not limited thereto and may include another type of information as long as the information allows controller selection methods to be compared.

The present invention can be implemented as, for example, a system, an apparatus, a method, a program, a recording medium (storage medium) or the like. Specifically, the present invention may be applied to a system including a plurality of devices (e.g., host computer, interface device, imaging apparatus, web application, etc.) or may be applied to an apparatus including a single device.

According to the present invention, it is possible to prevent a plurality of access points from operating as a controller that controls another access point and to more appropriately determine an access point that operates as a controller.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus that operates as an access point constructing a wireless Local Area Network (LAN), the communication apparatus, comprising:
   at least one processor; and
   at least one memory that stores a set of instructions for causing, when executed by the at least one processor, the communication apparatus to perform operations including:
   receiving a selection instruction for operating as a controller configured to control another access point in a network including at least one or more access points;
   identifying a controller selection method used in the received selection instruction;
   searching for another communication apparatus already operating as a controller in the network;
   obtaining, from another communication apparatus discovered as a search result, information indicating a controller selection method used in the other communication apparatus; and
   determining whether to change an apparatus that is to operate as the controller from the other communication apparatus to the communication apparatus based on comparison between the identified controller selection method and the controller selection method indicated by the obtained information.

2. The communication apparatus according to claim 1, wherein, in a case where another communication apparatus is not discovered as the search result, the communication apparatus operates as the controller.

3. The communication apparatus according to claim 1, wherein the operations further includes notifying the other communication apparatus that the communication apparatus operates as the controller, in a case where it is determined that an apparatus that is to operate as the controller is changed from the other communication apparatus to the communication apparatus.

4. The communication apparatus according to claim 1, wherein the operations further includes receiving configuration information set for the other communication apparatus to operate as the controller, from the other communication apparatus, in a case where it is determined that an apparatus that is to operate as the controller is changed from the other communication apparatus to the communication apparatus.

5. The communication apparatus according to claim 1, wherein, in a case where it is not determined that an apparatus that is to operate as the controller is changed from the other communication apparatus to the communication apparatus, the communication apparatus operates as an agent to be controlled by the other communication apparatus.

6. The communication apparatus according to claim 1, wherein the controller selection method includes a selection instruction issued by a user, a selection instruction issued by a service provider, and a selection instruction issued by automatic selection.

7. The communication apparatus according to claim 1, wherein the network is a network that is based on a Wi-Fi EasyMesh standard, and the communication apparatus obtains information included in an AP-Autoconfiguration Response message defined by an IEEE 1905.1 standard.

8. A control method of controlling a communication apparatus that operates as an access point constructing a wireless Local Area Network (LAN), the control method comprising:
   receiving a selection instruction for operating as a controller configured to control another access point in a network including at least one or more access points;
   identifying a controller selection method used in the received selection instruction;
   searching for another communication apparatus already operating as a controller in the network;
   obtaining, from another communication apparatus discovered by the searching, information indicating a controller selection method used in the other communication apparatus; and
   determining whether to change an apparatus that is to operate as the controller, from the different communication apparatus to the communication apparatus, based on comparison between the identified controller selection method and the controller selection method indicated by the obtained information.

9. A non-transitory computer-readable storage medium that stores a program for causing a computer included in a communication apparatus, which operates as an access point constructing a wireless Local Area Network (LAN), to:
   receive a selection instruction for operating as a controller configured to control another access point in a network including at least one or more access points;
   identify a controller selection method used in the received selection instruction;
   search for another communication apparatus already operating as a controller in the network;
   obtain, from another communication apparatus discovered by the search, information indicating a controller selection method used in the other communication apparatus; and
   determine whether to change an apparatus that is to operate as the controller, from the different communication apparatus to the communication apparatus, based on comparison between the identified controller selection method and the controller selection method indicated by the obtained information.

\* \* \* \* \*